United States Patent
Phelps et al.

(10) Patent No.: US 12,258,869 B2
(45) Date of Patent: Mar. 25, 2025

(54) TURBINE ENGINE PHONIC WHEEL WITH INTEGRATED LUBRICANT SCOOP

(71) Applicant: Raytheon Technologies Corporation, Farmington, CT (US)

(72) Inventors: Joseph B. Phelps, Rocky Hill, CT (US); Daniel E. Rosen, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/202,759

(22) Filed: May 26, 2023

(65) Prior Publication Data
US 2024/0392694 A1 Nov. 28, 2024

(51) Int. Cl.
*F02C 7/06* (2006.01)
*F01D 17/06* (2006.01)
*G01P 3/488* (2006.01)

(52) U.S. Cl.
CPC .............. *F01D 17/06* (2013.01); *F02C 7/06* (2013.01); *G01P 3/488* (2013.01); *F05D 2220/32* (2013.01); *F05D 2260/80* (2013.01); *F05D 2260/98* (2013.01)

(58) Field of Classification Search
CPC .... F01D 17/06; F02C 7/00; F02C 7/06; G01P 3/488; F05D 2220/32; F05D 2260/80; F05D 2260/98
See application file for complete search history.

(56) References Cited

U.S. PATENT DOCUMENTS

| | | | |
|---|---|---|---|
| 3,826,933 A * | 7/1974 | Anselmino | B60T 8/329 |
| | | | 310/90 |
| 9,267,855 B2 * | 2/2016 | Ameil | G01P 3/488 |
| 9,316,231 B2 | 4/2016 | Simms | |
| 9,708,926 B2 | 7/2017 | Curlier | |
| 10,168,236 B2 | 1/2019 | Curlier | |
| 10,174,629 B1 | 1/2019 | Valva | |
| 2013/0058775 A1 | 3/2013 | Simms | |
| 2016/0281527 A1 | 9/2016 | Lucas | |
| 2017/0115320 A1 | 4/2017 | Turner | |
| 2020/0200036 A1 | 6/2020 | Petersen | |
| 2020/0200788 A1 | 6/2020 | Davies | |

FOREIGN PATENT DOCUMENTS

CN 102607751 B 6/2014

OTHER PUBLICATIONS

EP Search Report for EP Patent Application No. 24166480.4 dated Jun. 6, 2024.

* cited by examiner

*Primary Examiner* — Steven M Sutherland
(74) *Attorney, Agent, or Firm* — Getz Balich LLC

(57) ABSTRACT

An assembly is provided for a turbine engine. This turbine engine assembly includes a rotating assembly and a sensor. The rotating assembly is configured to rotate about an axis. The rotating assembly includes an engine shaft and a phonic wheel threaded onto the engine shaft. The phonic wheel includes a lubricant scoop. The sensor is configured to measure fluctuations in a magnetic field induced by the phonic wheel during rotation of the rotating assembly about the axis.

17 Claims, 5 Drawing Sheets

TURBINE ENGINE PHONIC WHEEL WITH INTEGRATED LUBRICANT SCOOP

GOVERNMENT LICENSE RIGHTS

This invention was made with Government support. The Government has certain rights in this invention.

BACKGROUND OF THE DISCLOSURE

1. Technical Field

This disclosure relates generally to a turbine engine and, more particularly, to a sensor system for the turbine engine.

2. Background Information

A gas turbine engine may include a sensor system configured to measure a rotational velocity of a rotating element such as an engine shaft. Various type of sensor systems are known in the art, including those which utilize a phonic wheel to induce fluctuations in a magnetic field. While these known sensor systems have various benefits, there is still room in the art for improvement.

SUMMARY OF THE DISCLOSURE

According to an aspect of the present disclosure, an assembly is provided for a turbine engine. This turbine engine assembly includes a rotating assembly and a sensor. The rotating assembly is configured to rotate about an axis. The rotating assembly includes an engine shaft and a phonic wheel threaded onto the engine shaft. The phonic wheel includes a lubricant scoop. The sensor is configured to measure fluctuations in a magnetic field induced by the phonic wheel during rotation of the rotating assembly about the axis.

According to another aspect of the present disclosure, another assembly is provided for a turbine engine. This turbine engine assembly includes a rotating assembly and a sensor. The rotating assembly is configured to rotate about an axis. The rotating assembly includes an engine shaft and a phonic wheel threaded onto the engine shaft at a threaded interface. The phonic wheel is abutted axially against the engine shaft at a location discrete from the threaded interface. The sensor is configured to measure fluctuations in a magnetic field induced by the phonic wheel during rotation of the rotating assembly about the axis.

According to still another aspect of the present disclosure, another assembly is provided for a turbine engine. This turbine engine assembly includes a rotating assembly and a sensor. The rotating assembly is configured to rotate about an axis. The rotating assembly includes an engine shaft, an inner race of a bearing and a phonic wheel. The inner race is mounted on the engine shaft. The phonic wheel is attached to the engine shaft by a threaded interface between the phonic wheel and the engine shaft. The phonic wheel is rotationally fixed to the inner race by an anti-rotation feature axially between the phonic wheel and the inner race. The sensor is configured to measure fluctuations in a magnetic field induced by the phonic wheel during rotation of the rotating assembly about the axis.

The phonic wheel may include an axial lubricant scoop.

The rotating assembly may also include an engine component mounted on the engine shaft. The phonic wheel may be rotationally fixed to the engine component by an anti-rotation feature.

The turbine engine assembly may also include a sensor system which includes the phonic wheel and the sensor. The sensor system may be configured to determine a rotational velocity of the rotating assembly.

The phonic wheel may also include a castellated periphery. The castellated periphery may be configured to induce the fluctuations in the magnetic field during the rotation of the rotating assembly about the axis.

A tip of the sensor may be disposed radially outboard of and adjacent the castellated periphery.

The castellated periphery may include a plurality of indentations arranged circumferentially about the axis. Each of the indentations may project radially and axially into the phonic wheel.

Each of the indentations may have a lateral width. Each circumferentially neighboring pair of the indentations may be spaced apart by a lateral distance that is equal to or less than the lateral width.

The castellated periphery may include a plurality of teeth arranged circumferentially about the axis. Each of the teeth may project radially out to a respective distal end.

The lubricant scoop may be configured as or otherwise include an axial lubricant scoop.

The lubricant scoop may include a gutter projecting radially in an outward direction into the phonic wheel. The gutter may project axially into the phonic wheel. The gutter may extend circumferentially about the axis within the phonic wheel. The engine shaft may include a plurality of passages arranged circumferentially about the axis. Each of the passages may extend axially into the engine shaft from the gutter.

The engine shaft may also include a shoulder. Each of the passages may extend axially through the shoulder. The phonic wheel may be threaded onto the shoulder.

The phonic wheel may axially engage the engine shaft at a location discrete from a threaded interface between the phonic wheel and the engine shaft.

The engine shaft may also include a shoulder. The rotating assembly may also include an engine component mounted on the engine shaft and abutted axially against the shoulder. The phonic wheel may circumscribe and may be threaded onto the shoulder.

The engine component may include an inner race of a rolling element bearing.

The rotating assembly may also include a stack nut threaded onto the engine shaft. The engine component may be axially stacked and retained between the stack nut and the shoulder.

The rotating assembly may also include an engine component mounted on the engine shaft. The phonic wheel may also include an anti-rotation tab projecting axially partially into a recess in the engine component.

The rotating assembly may also include a bladed rotor connected to the engine shaft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
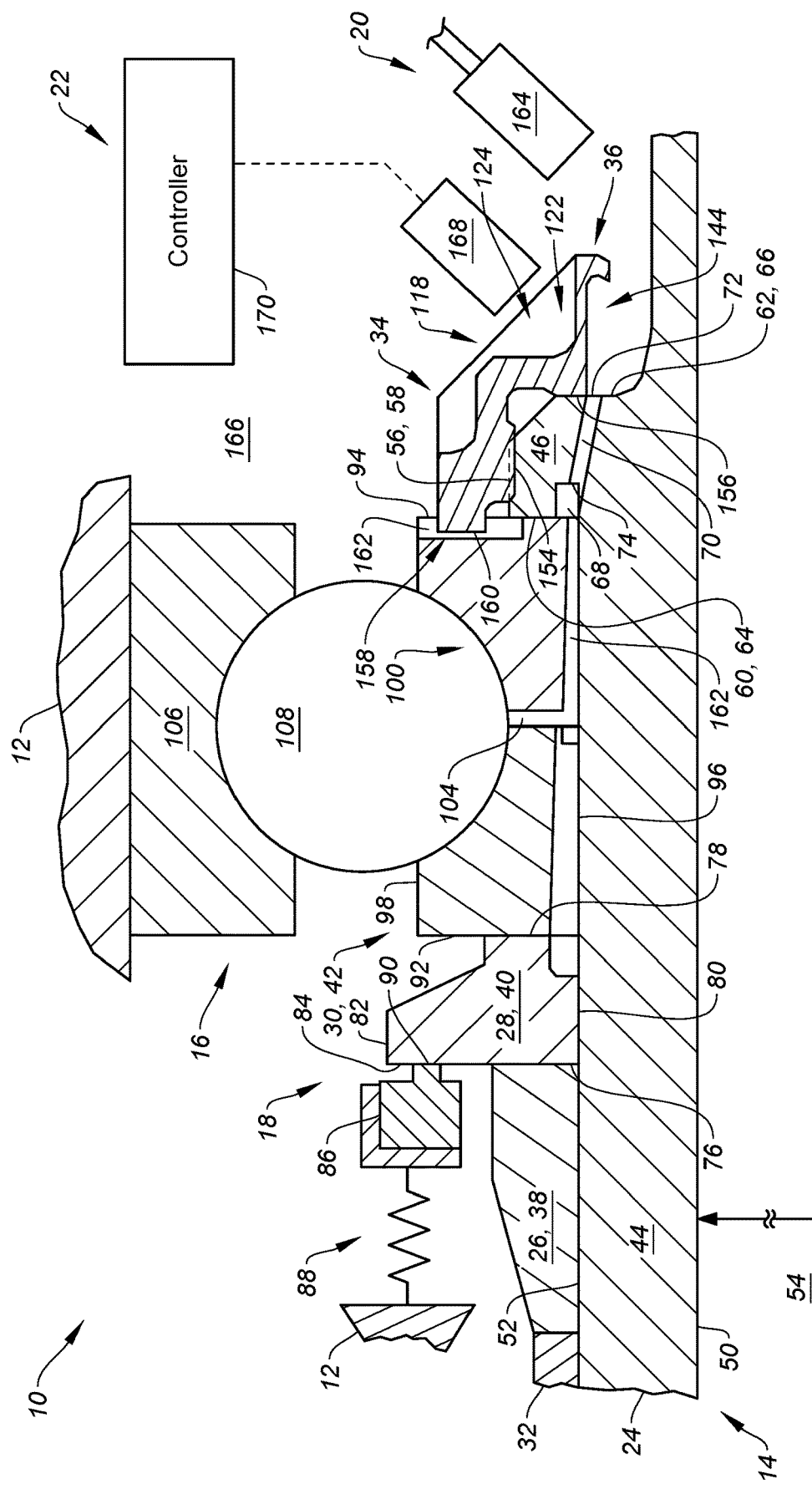
FIG. 1 is a partial side sectional illustration of an assembly for a turbine engine.

FIG. 1 is a partial side sectional illustration of an assembly 10 for a turbine engine. This engine assembly 10 includes a stationary structure 12, a rotating assembly 14 and a bearing 16 rotatably mounting the rotating assembly 14 to the stationary structure 12. The engine assembly 10 also includes a seal assembly 18, a lubrication system 20 and a sensor system 22.

The rotating assembly 14 of FIG. 1 includes an engine shaft 24, one or more rotating engine components 26, 28 and 30 and a stack nut 32 securing the engine components 26, 28 and 30 on the engine shaft 24. The rotating assembly 14 of FIG. 1 also includes a phonic wheel 34 with an integrated (e.g., axial) lubricant scoop 36. The first engine component 26 may be configured as or otherwise include a stack spacer 38. The second engine component 28 may be configured as or otherwise include a seal land 40 of the seal assembly 18. The third engine component 30 may be configured as or otherwise include an inner race 42 of the bearing 16. The present disclosure, however, is not limited to the foregoing exemplary engine components.

The engine shaft 24 includes a shaft base 44 and a shaft shoulder 46. The engine shaft 24 and its shaft base 44 extend axially along an axis 48, which axis 48 may be an axial centerline and/or a rotational axis of the rotating assembly 14 and its members 32, 34, 36, 38, 40 and 42. The shaft base 44 extends radially from a radial inner side 50 of the engine shaft 24 and its shaft base 44 to a radial outer side 52 of the shaft base 44. The shaft base 44 extends circumferentially about (e.g., completely around) the axis 48. The engine shaft 24 and its shaft base 44 may thereby have a full-hoop (e.g., tubular) geometry. Moreover, the shaft base 44 forms an inner bore 54 in the engine shaft 24. This inner bore 54 extends axially within, into or through the engine shaft 24 and its shaft base 44 along the shaft inner side 50.

The shaft shoulder 46 is connected to (e.g., formed integral with) the shaft base 44. The shaft shoulder 46 may be configured as an annular protrusion such as a flange or a rim. The shaft shoulder 46 of FIG. 1, for example, projects radially out from the shaft base 44 at its base outer side 52 to a distal radial outer side 56 of the shaft shoulder 46. At least a portion or an entirety of the shaft shoulder 46 along the shoulder outer side 56 is threaded. The shaft shoulder 46 of FIG. 1, in particular, includes an outer threaded region 58 at the shoulder outer side 56. The shaft shoulder 46 extends axially along the axis 48 between opposing axial sides 60 and 62 of the shaft shoulder 46.

The shaft shoulder 46 includes plurality of (e.g., annular) engagement surfaces 64 and 66; e.g., face surfaces, contact surfaces, etc. The shoulder first engagement surface 64 is disposed on the shoulder first side 60. The shoulder second engagement surface 66 is disposed on the shoulder second side 62. The shoulder second engagement surface 66 is thereby arranged axially opposite the shoulder first engagement surface 64. The shaft shoulder 46 of FIG. 1 also includes a lubricant channel 68 and a plurality of internal lubricant passages 70.

The shoulder channel 68 is disposed at the shoulder first side 60, and may be radially adjacent the shaft base 44. The shoulder channel 68 of FIG. 1, for example, projects axially along the axis 48 into the shaft shoulder 46 from the shoulder first engagement surface 64 to a distal axial end of the shoulder channel 68. The shoulder channel 68 extends radially within the engine shaft 24 between and to opposing radial sides of the shoulder channel 68. The channel inner side may be formed by the shaft base 44. The channel outer side is formed by the shaft shoulder 46. The shoulder channel 68 extends circumferentially about (e.g., completely around) the axis 48 within the engine shaft 24 and its shaft shoulder 46. The shoulder channel 68 may thereby have a full-hoop (e.g., annular) geometry.

The shoulder passages 70 are arranged circumferentially about the axis 48 in an array; e.g., a circular array. Each of the shoulder passages 70 is configured as a through-hole which extends axially through the engine shaft 24 and its shaft shoulder 46. Each shoulder passage 70 of FIG. 1, for example, extends axially (and slightly radially in a radial outward direction away from the axis 48 in FIG. 1) from an inlet 72 into the respective shoulder passage 70 to an outlet 74 from the respective shoulder passage 70. The shoulder passage inlet 72 is disposed at the shoulder second side 62, for example in the second shoulder engagement surface 66. The shoulder passage outlet 74 is disposed at (e.g., on, adjacent or proximate) the shoulder first side 60, for example in the shoulder channel axial end. The shoulder passages 70 are thereby fluidly coupled with the shoulder channel 68, and these elements 68 and 70 provide a lubricant flowpath axially across the shaft shoulder 46.

The seal land 40 extends axially along the axis 48 between and to opposing axial sides 76 and 78 of the seal land 40. The seal land 40 extends radially from a radial inner side 80 of the seal land 40 to a radial outer side 82 of the seal land 40. The seal land 40 extends circumferentially about (e.g., completely around) the axis 48. The seal land 40 may thereby have a full-hoop (e.g., annular) geometry. The seal land 40 of FIG. 1 includes a (e.g., annular) seal land surface 84 at the seal land first side 76, for example radially adjacent (e.g., contiguous with) the seal land outer side 82.

The seal assembly 18 of FIG. 1 also includes a (e.g., annular) seal element 86 such as a carbon seal element. Briefly, the seal element 86 is mounted to the stationary structure 12 through a seal mounting assembly 88. This seal mounting assembly 88 is configured to push or otherwise bias the seal element 86 axially against the seal land 40 to provide a seal interface between a seal element surface 90 of the seal element 86 and the seal land surface 84. The seal assembly 18 may thereby seal a gap between the stationary structure 12 and the seal land 40.

The inner race 42 extends axially along the axis 48 between and to opposing axial sides 92 and 94 of the bearing 16 and its inner race 42. The inner race 42 extends radially from a radial inner side 96 of the bearing 16 and its inner race 42 to a radial outer side 98 of the inner race 42. The inner race 42 extends circumferentially about (e.g., completely around) the axis 48. The inner race 42 may thereby have a full-hoop (e.g., annular) geometry. The inner race 42 may include an (e.g., annular) outer groove 100, one or more inner lubricant channels 102 (one visible in FIG. 1) and one or more internal lubricant passages 104 (one visible in FIG. 1).

The race groove 100 is disposed at the inner race outer side 98. This race groove 100 projects radially (in a radial inward direction towards the axis 48) into the inner race 42 from the inner race outer side 98. The race groove 100 extends axially within the inner race 42 along the axis 48.

The race groove 100 extends circumferentially about (e.g., completely around) the axis 48 within the inner race 42.

The race channels 102 are arranged circumferentially about the axis 48 in an array; e.g., a circular array. Each of the race channels 102 extends axially through the inner race 42 between and to the inner race first side 92 and the inner race second side 94. Each of the race channels 102 projects radially (in the radial outward direction) into the inner race 42 from the inner race inner side 96. Each of the race channels 102 extends laterally (e.g., circumferentially or tangentially) within the inner race 42 between opposing lateral sides of the respective race channel 102.

The race passages 104 are arranged circumferentially about the axis 48 in an array; e.g., a circular array. Each of the race passages 104 is configured as a through-hole which extends radially through the inner race 42. Each race passage 104 of FIG. 1, for example, extends radially (in the radial outward direction) from a respective one of the race channels 102 to the race groove 100. The race passages 104 may thereby fluidly couple the race channels 102 to the race groove 100.

The bearing 16 may be configured as a rolling element bearing. The bearing 16 of FIG. 1, for example, also includes an outer race 106 and a plurality of rolling elements 108 (one visible in FIG. 1) arranged circumferentially about the axis 48 and the inner race 42 in an array; e.g., a circular array. Briefly, the outer race 106 is fixedly mounted to the stationary structure 12 and circumscribes the inner race 42 as well as an array of the rolling elements 108. The rolling elements 108 may be configured as ball bearing elements or alternatively roller bearing elements. Each rolling element 108 of FIG. 1 is seated within the race groove 100 of the inner race 42. Each rolling element 108 is disposed radially between and engages (e.g., contacts, rolls along, etc.) the inner race 42 and the outer race 106.

The stack nut 32 is configured to axially retain and rotatably fix various engine components 38, 40 and 42 to the engine shaft 24 in a stack, which stacked engine components 38, 40 and 42 do not include the phonic wheel 34 as discussed below in further detail. The bearing 16 and its inner race 42, for example, are mounted on the engine shaft 24. The inner race 42 may be disposed axially adjacent the shaft shoulder 46. The second side 94 of the inner race 42 of FIG. 1, for example, axially engages (e.g., is abutted axially against, contacts, etc.) the shoulder first engagement surface 64. With this arrangement, the race channels 102 are fluidly coupled to the shoulder passages 70 through the shoulder channel 68. The seal land 40 is mounted on the engine shaft 24 axially adjacent the bearing 16 and its inner race 42. The second side 78 of the seal land 40 of FIG. 1, for example, axially engages (e.g., is abutted axially against, contacts, etc.) the first side 92 of the inner race 42. The stack spacer 38 is mounted on the engine shaft 24 axially adjacent the seal land 40. A second side of the stack spacer 38 of FIG. 1, for example, axially engages (e.g., is abutted axially against, contacts, etc.) the first side 76 of the seal land 40, and is disposed radially inboard of the seal element 86 and the seal mounting assembly 88. The stack nut 32 is threaded onto a threaded region of the engine shaft 24 and its shaft base 44, where the stack nut 32 axially engages (e.g., is abutted axially against, contacts, etc.) a first side of the stack spacer 38. The stack nut 32 may be torqued to provide a preload to the stacked engine components 38, 40 and 42 axially between the stack nut 32 and the shaft shoulder 46. The stacked engine components 38, 40 and 42 may thereby be clamped (e.g., gripped, squeezed, etc.) between the stack nut 32 and the shaft shoulder 46. This preloading/clamping of the engine components 38, 40 and 42 axially and rotationally fixes those engine components 38, 40 and 42 to the engine shaft 24.

Figure 2:
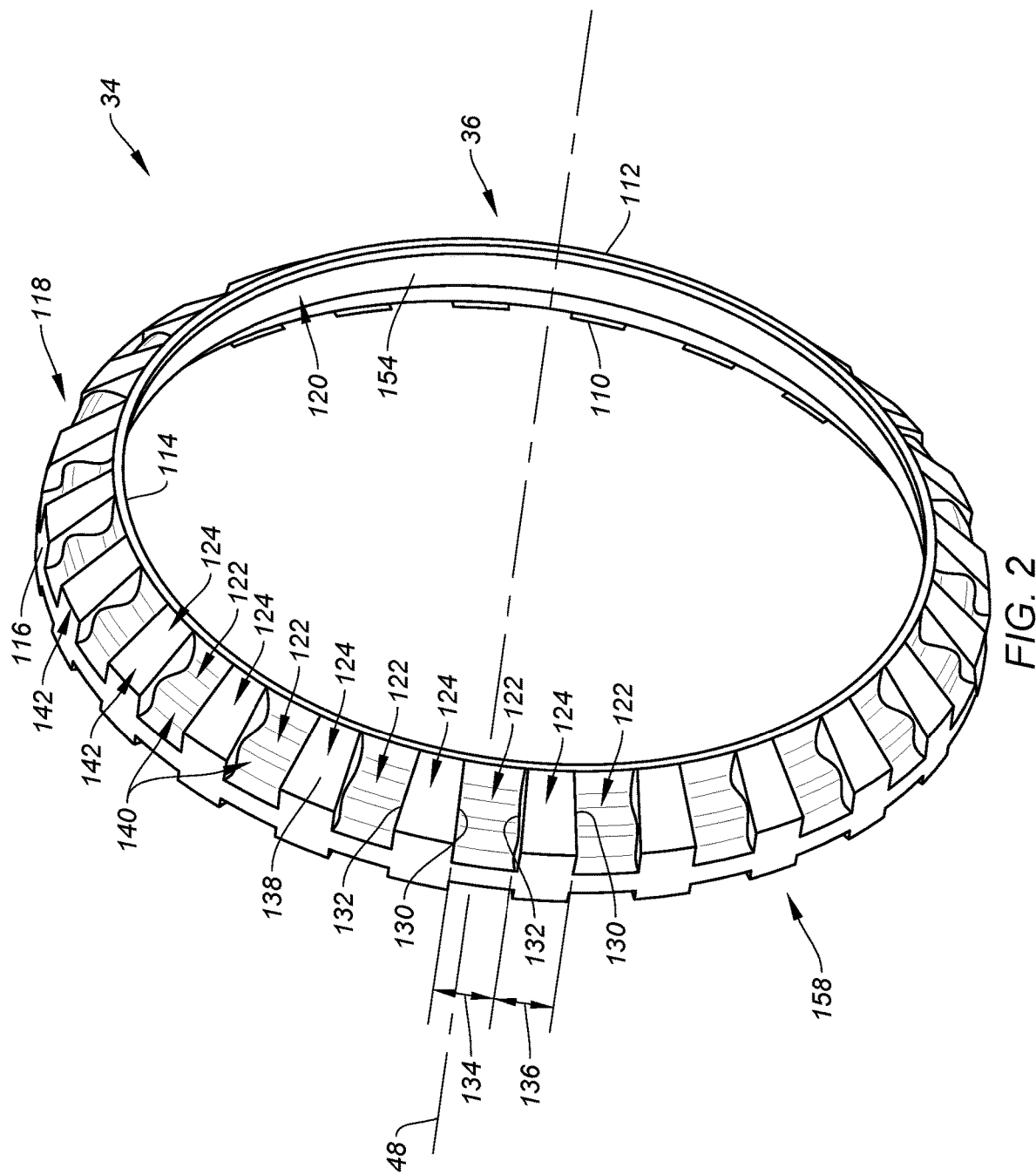
FIG. 2 is a perspective illustration of a phonic wheel with an integrated lubricant scoop.
Figure 3:
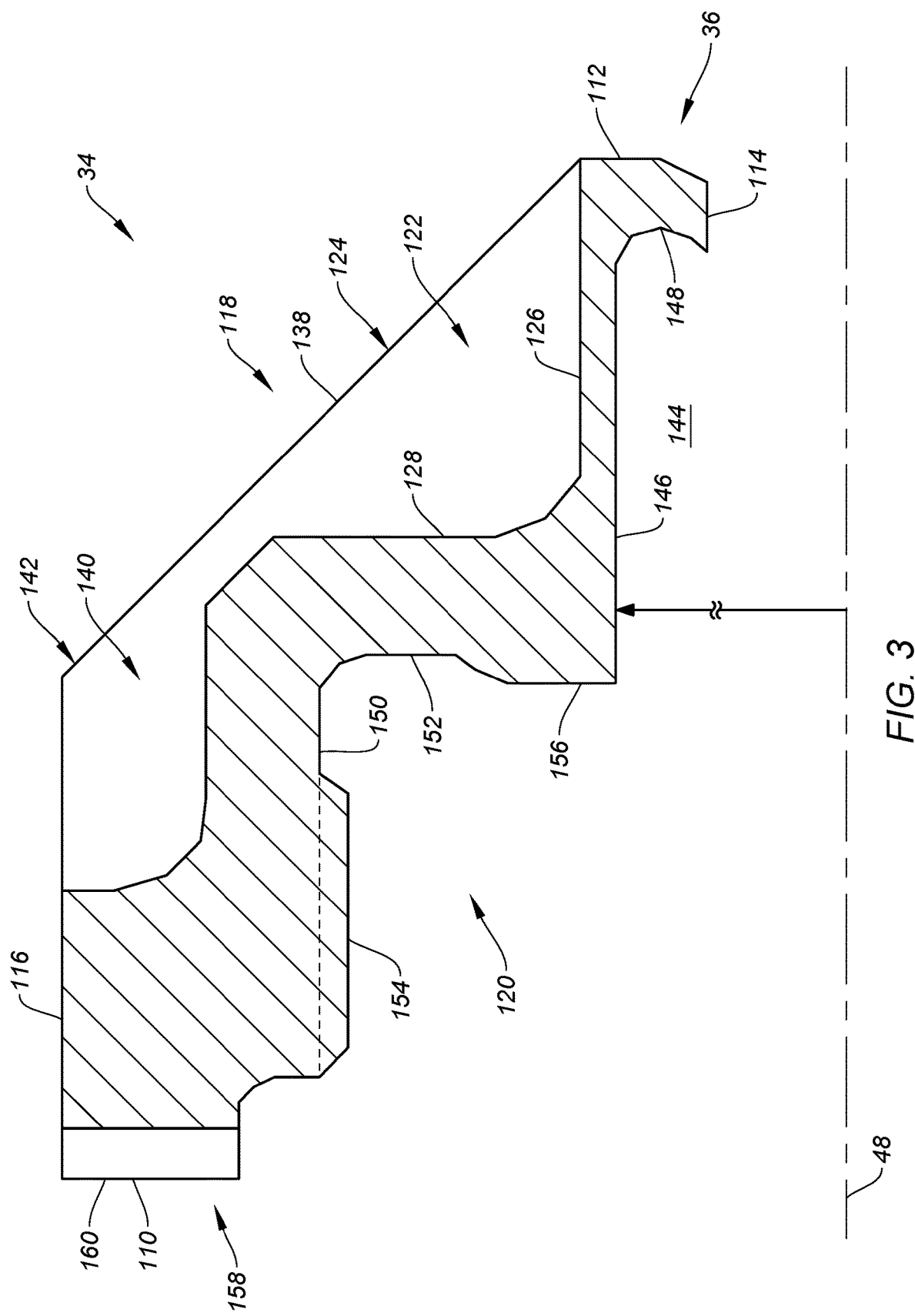
FIG. 3 is a partial side sectional illustration of the phonic wheel.

Referring to FIG. 2, the phonic wheel 34 extends axially along the axis 48 between and to opposing axial sides 110 and 112 of the phonic wheel 34. The phonic wheel 34 extends radially from a radial inner side 114 of the phonic wheel 34 to a radial outer side 116 of the phonic wheel 34. The phonic wheel 34 extends circumferentially about (e.g., completely around) the axis 48. The phonic wheel 34 may thereby have a full-hoop (e.g., annular) geometry. Referring to FIG. 3, the phonic wheel 34 includes an outer castellated periphery 118, the lubricant scoop 36 and a counterbore 120.

The castellated periphery 118 is disposed at or about the wheel outer side 116, for example axially adjacent or proximate the wheel second side 112. The castellated periphery 118 of FIG. 2 is formed by a plurality of indentations 122 and a plurality of teeth 124. These indentations 122 are circumferentially interspersed with the teeth 124, and the teeth 124 are circumferentially interspersed with the indentations 122. Each indentation 122 of FIG. 2, for example, is disposed between a circumferentially neighboring (e.g., adjacent) pair of the teeth 124. Similarly, each tooth 124 of FIG. 2 is disposed between a circumferentially neighboring pair of the indentations 122. With this arrangement, the teeth 124 may form the indentations 122.

Figure 4:
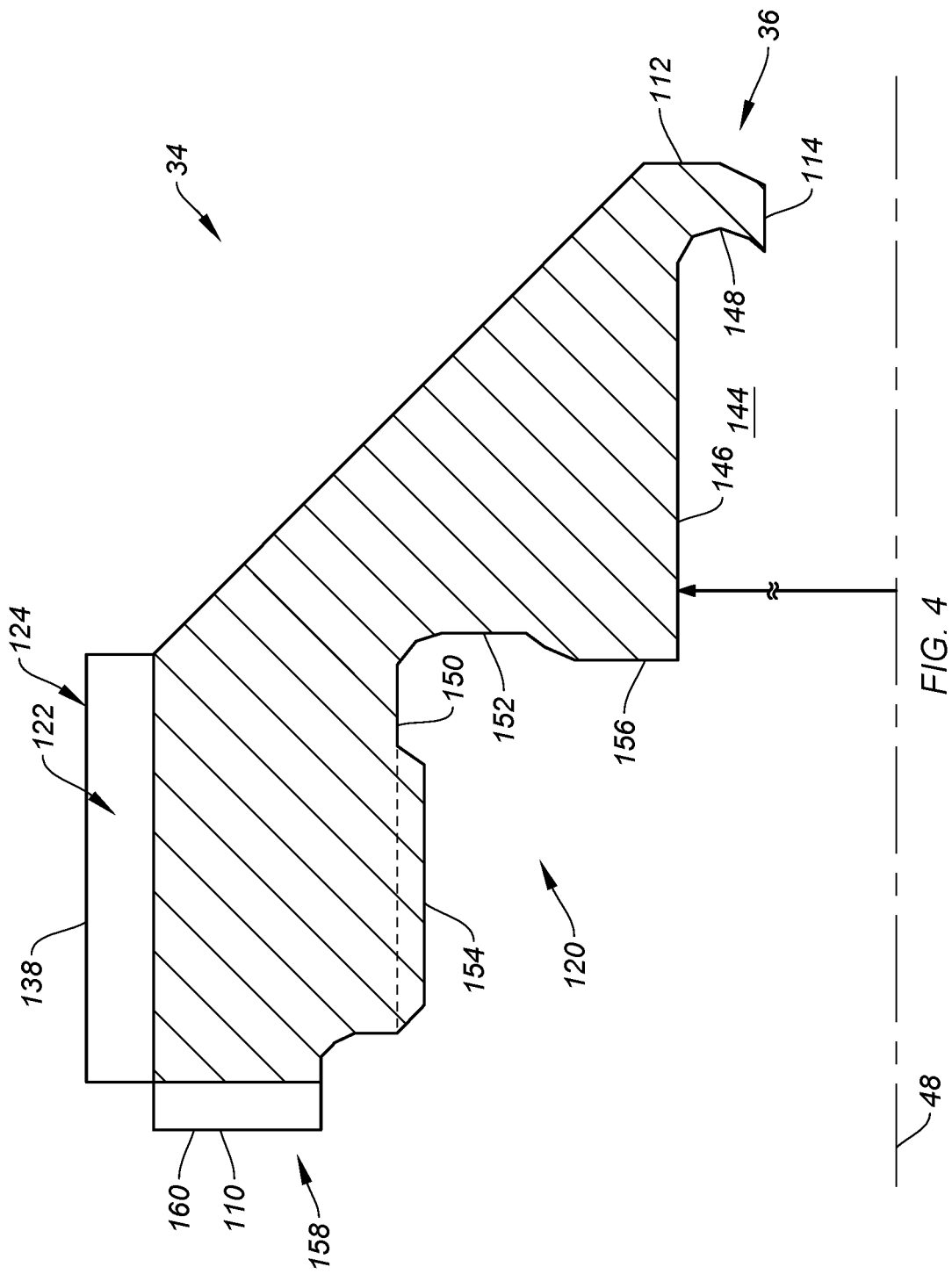
FIG. 4 is a partial side sectional illustration of the phonic wheel with another castellated periphery.

Referring to FIG. 3, each indentation 122 projects radially (in the radial inward direction) into the phonic wheel 34 from or about the wheel outer side 116 to a distal radial inner end 126 of the respective indentation 122. Each indentation 122 projects axially into the phonic wheel 34 from or about the wheel second side 112 to a distal axial end 128 of the respective indentation 122. However, it is contemplated each indentation 122 may alternatively extend axially through the phonic wheel 34 (e.g., see FIG. 4). Referring to FIG. 2, each indentation 122 extends laterally within the phonic wheel 34 between opposing lateral sides 130 and 132 of the respective indentation 122, which lateral sides 130 and 132 are formed by a respective circumferentially neighboring pair of the teeth 124. Each indentation 122 thereby has a lateral width 134 measured between the respective lateral sides 130 and 132/the respective circumferentially neighboring pair of the teeth 124. This width 134 may be sized equal to or different (e.g., greater) than a lateral distance 136 between each circumferentially neighboring pair of the indentations 122; e.g., a lateral width of a respective tooth 124. Referring again to FIG. 3, each indentation 122 may have a polygonal (e.g., substantially triangular) sectional geometry when viewed, for example, in a reference plane parallel with (e.g., including) the axis 48.

Each tooth 124 projects radially out to a respective distal end 138 at (or about) the wheel outer side 116 and/or the wheel second side 112. This tooth end 138 may be radially tapered. The tooth end 138 of FIG. 3, for example, radially tapers inward as the phonic wheel 34 extends axially away from its wheel first side 110 and towards its wheel second side 112. Referring to FIG. 2, each tooth 124 extends laterally between and to its respective lateral sides 130 and 132.

With the foregoing arrangement, the castellated periphery 118 of the phonic wheel 34 and its elements 122 and 124 may also form a wrenching feature for the phonic wheel 34. A tool, for example, may be inserted into some or all of the indentations 122 and/or grip some or all of the teeth 124 to facilitate rotating the phonic wheel 34 about the axis 48 and torquing the phonic wheel 34 during installation or removal.

In some embodiments, the castellated periphery 118 may be extended to include a second set of indentations 140 and a second set of teeth 142. These second indentations 140 and the second teeth 142 may have a similar configuration as the indentations 122 and the teeth 124 described above. Moreover, the second indentations 140 and the second teeth 142 may be configured as extensions of the indentations 122 and the teeth 124 described above. Extending the castellated periphery 118 in this manner may further reduce a weight of the phonic wheel 34. Of course, in other embodiments, it is contemplated the second set of indentations 140 and the second set of teeth 142 may be omitted. Still alternatively, the second set of indentations 140 and the second set of teeth 142 may be configured as the wrenching feature.

Referring to FIG. 3, the lubricant scoop 36 is configured to collect lubricant at the phonic wheel second side 112. The lubricant scoop 36 of FIG. 3, for example, includes a lubricant gutter 144. This gutter 144 projects radially (in the radial outward direction) into the phonic wheel 34 from the wheel inner side 114 to a distal radial outer side 146 of the gutter 144. The gutter 144 projects axially into the phonic wheel 34 to a distal axial end 148 of the gutter 144. The gutter 144 extends circumferentially about (e.g., completely around) the axis 48 within the phonic wheel 34. The gutter 144 may thereby have a full-hoop (e.g., annular) geometry.

The counterbore 120 is disposed at (or about) the wheel first side 110. The counterbore 120 projects radially (in the radial outward direction) into the phonic wheel 34 from the gutter outer side 146 to a radial outer side 150 of the counterbore 120. The counterbore 120 projects axially into the phonic wheel 34 to an axial end 152 of the counterbore 120. The counterbore 120 extends circumferentially about (e.g., completely around) the axis 48 within the phonic wheel 34. The counterbore 120 may thereby have a full-hoop (e.g., annular) geometry. Within this counterbore 120, the phonic wheel 34 of FIG. 1 includes an inner threaded region 154 and an (e.g., annular) engagement surface 156; e.g., a face surface, a contact surface, etc. The inner threaded region 154 is disposed at (or about) the counterbore outer side 150. The wheel engagement surface 156 is disposed at (or about) the counterbore axial end 152.

The phonic wheel 34 is constructed from or otherwise includes ferromagnetic material. Examples of this ferromagnetic material include, but are not limited to, iron (Fe), nickel (Ni), cobalt (co) or alloys thereof such as stainless steel. The phonic wheel 34 may be formed as a monolithic body. Herein, the term "monolithic" may describe a component which is formed as a single unitary body. The phonic wheel 34 and its various features, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. The present disclosure, however, is not limited to the foregoing exemplary manufacturing techniques.

Referring to FIG. 1, the phonic wheel 34 is mounted onto and fixedly attached to the engine shaft 24. The phonic wheel 34 of FIG. 1, for example, is threaded onto the engine shaft 24 and its shaft shoulder 46, where the inner threaded region 154 is mated with (e.g., threaded onto) the outer threaded region 58. The wheel engagement surface 156 axially engages (e.g., is abutted axially against, contacts, etc.) the shoulder second engagement surface 66. The phonic wheel 34 may also be torqued to provide a preload between the phonic wheel 34 and the shaft shoulder 46. With this arrangement, the phonic wheel 34 axially engages the engine shaft 24 and its shaft shoulder 46 at a discrete (e.g., radially inward) location from the threaded interface radially between the phonic wheel 34 and the shaft shoulder 46. Moreover, while the phonic wheel 34 axially engages and may be preloaded against the engine shaft 24 and its shaft shoulder 46, the phonic wheel 34 may be axially disengaged from (e.g., may be axially separated from) the bearing 16 and its inner race 42. The phonic wheel 34 therefore is structurally outside of the stack of the engine components 38, 40 and 42. However, it is contemplated the phonic wheel 34 may contact the bearing 16 and its inner race 42. An anti-rotation feature 158, for example, may be provided between the phonic wheel 34 and the inner race 42. The anti-rotation feature 158 of FIG. 1 includes a plurality of anti-rotation tabs 160 (see also FIGS. 2 and 3) arranged circumferentially about the axis 48 in an array (e.g., a circular array) at the wheel first side 110. The phonic wheel 34 may thereby have a castellated rim at the wheel first side 110 (see FIGS. 2 and 3). Each of the tabs 160 may project axially partially into a respective recess 162 in the inner race 42. The anti-rotation feature 158 and its tabs 160 may thereby rotationally lock (e.g., fix) the phonic wheel 34 to the bearing 16 and its inner race 42 without transferring axial loads between the inner race 42 and the phonic wheel 34. With such an arrangement, the phonic wheel 34 may be mounted to the engine shaft 24 before the inner race 42. Of course, it is contemplated other techniques may also or alternatively be used for rotationally fixing (e.g., preventing backing off of) the phonic wheel 34.

The lubrication system 20 is configured to deliver lubricant (e.g., engine oil) to one or more of the engine components 40 and/or 42. The lubrication system 20 of FIG. 1, for example, includes the lubricant elements 36, 68, 70, 102, 104 and 144 and a lubricant injector 164; e.g., a nozzle. The lubricant injector 164 of FIG. 1 is configured to direct (e.g., inject) the lubricant into a bearing compartment 166 towards the lubricant scoop 36. This lubricant may be collected in the gutter 144 and directed to the bearing 16 and its inner race 42 through the shoulder passages 70 and the shoulder channel 68. More particularly, the shoulder channel 68 may distribute the lubricant to the race channels 102. Each race channel 102 may direct at least some of that lubricant to the rolling elements 108 through the race passage 104. Each race channel 102 may also direct some of the lubricant to the seal land 40 for cooling the seal land 40, for example, proximate the seal land surface 84.

With the foregoing arrangement, the lubricant is directed towards a location radially inward and axially to a side of the castellated periphery 118. Windage generated by the castellated periphery 118 within the bearing compartment 166 may thereby be remote from the lubricant injection and collection area. The windage generated by the castellated periphery 118 may thereby have little or no (e.g., adverse) effect on a trajectory of the lubricant injected by the lubricant injector 164, nor on collection of the lubricant by the lubricant scoop 36 and its gutter 144. Reducing lubricant exposure to such windage reduces lubricant churning within the bearing compartment 166 as well as increases likelihood that the lubricant will be delivered as designed without starving downstream engine components of the lubricant for lubrication and/or cooling.

The sensor system 22 is configured to measure at least one parameter of the rotating assembly 14. The sensor system 22 of FIG. 1, for example, includes the phonic wheel 34, a speed sensor 168 and a controller 170. The speed sensor 168 may be a magnetic pickup probe. A tip of the speed sensor 168 is disposed radially outboard of and adjacent the phonic wheel 34 and its castellated periphery 118. The speed sensor 168 is configured to measure fluctuations in a magnetic field which are induced by the phonic wheel 34 and its castellated periphery 118 during rotation of the rotating assembly 14. The speed sensor 168, for example, may output a voltage signal (e.g., a series of electric pulses) indicative of when each tooth 124 (or indentation 122) passes the tip of the speed sensor 168. The controller 170 receives the voltage signal and may process the voltage signal to determine a rotational velocity that the phonic wheel 34 and its castellated periphery 118 and, thus, the rotating assembly 14 and its engine shaft 24 are rotating about the axis 48. Of course, the controller 170 may also or alternatively process the voltage signal to determine various other engine parameters such as, but not limited to, shaft torque and the like.

By integrating the lubricant scoop 36 with the phonic wheel 34, the sensor system 22 may measure the parameter (s) of interest such as rotational velocity at a location of interest such as adjacent the bearing 16. This integration may reduce engine assembly part count, may reduce space requirements and complexity within the bearing compartment 166, and may reduce overall weight. Moreover, the integration may facilitate improved lubricant delivery as discussed above.

Figure 5:
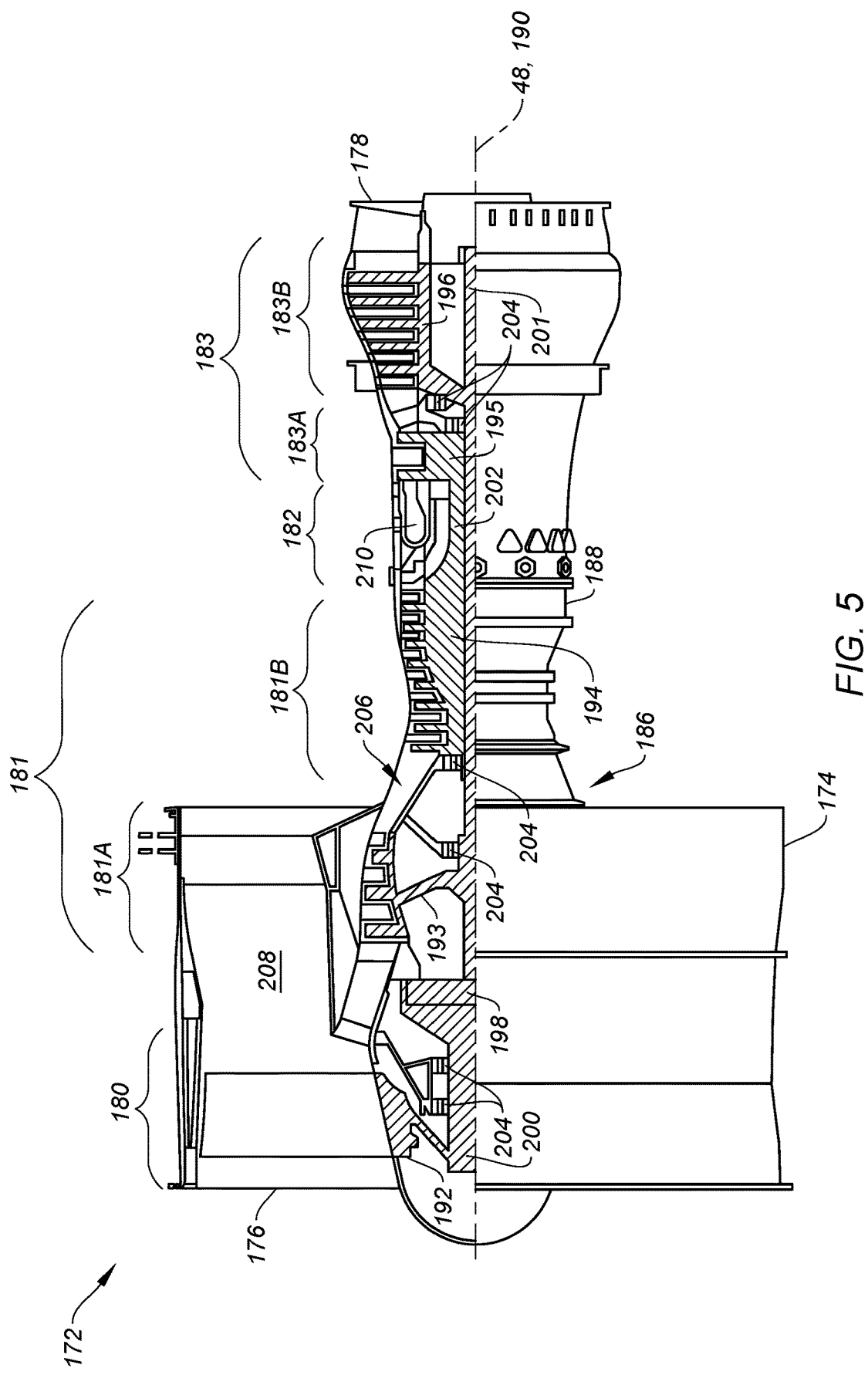
FIG. 5 is a side cutaway illustration of a gas turbine engine.

FIG. 5 illustrates an example of the turbine engine which may include the engine assembly 10. This turbine engine is configured as a turbofan gas turbine engine 172. The turbine engine 172 of FIG. 5 extends along an axial centerline 174 (e.g., the axis 48) between an upstream airflow inlet 176 and a downstream combustion products exhaust 178. The turbine engine 172 includes a fan section 180, a compressor section 181, a combustor section 182 and a turbine section 183. The compressor section 181 includes a low pressure compressor (LPC) section 181A and a high pressure compressor (HPC) section 181B. The turbine section 183 includes a high pressure turbine (HPT) section 183A and a low pressure turbine (LPT) section 183B.

The engine sections 180-183B are arranged sequentially along the axial centerline 174 within an engine housing 186. This engine housing 186 includes an inner case 188 (e.g., a core case) and an outer case 190 (e.g., a fan case). The inner case 188 may house one or more of the engine sections 181A-183B; e.g., a core of the turbine engine 172. The outer case 190 may house at least the fan section 180. The stationary structure 12 of FIG. 1 may be connected to or configured as part of the engine housing 186.

Each of the engine sections 180, 181A, 181B, 183A and 183B includes a respective bladed rotor 192-196. Each of these bladed rotors 192-196 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 192 is connected to a geartrain 198, for example, through a fan shaft 200. The geartrain 198 and the LPC rotor 193 are connected to and driven by the LPT rotor 196 through a low speed shaft 201. The HPC rotor 194 is connected to and driven by the HPT rotor 195 through a high speed shaft 202. The engine shafts 200-202 are rotatably supported by a plurality of bearings 204; e.g., rolling element and/or thrust bearings. Each of these bearings 204 is connected to the engine housing 186 by at least one stationary structure. The bearing 16 of FIG. 1 may be configured as any one of these bearings 204, and the engine shaft 24 of FIG. 1 may be configured as any one of the engine shafts 200-202.

During operation, air enters the turbine engine 172 through the airflow inlet 176. This air is directed through the fan section 180 and into a core flowpath 206 and a bypass flowpath 208. The core flowpath 206 extends sequentially through the engine sections 181A-183B. The air within the core flowpath 206 may be referred to as "core air". The bypass flowpath 208 extends through a bypass duct, which bypasses the engine core. The air within the bypass flowpath 208 may be referred to as "bypass air".

The core air is compressed by the LPC rotor 193 and the HPC rotor 194 and directed into a combustion chamber 210 of a combustor in the combustor section 182. Fuel is injected into the combustion chamber 210 and mixed with the compressed core air to provide a fuel-air mixture. This fuel-air mixture is ignited and combustion products thereof flow through and sequentially cause the HPT rotor 195 and the LPT rotor 196 to rotate. The rotation of the HPT rotor 195 and the LPT rotor 196 respectively drive rotation of the HPC rotor 194 and the LPC rotor 193 and, thus, compression of the air received from a core airflow inlet. The rotation of the LPT rotor 196 also drives rotation of the fan rotor 192, where the rotation of the fan rotor 192 propels the bypass air through and out of the bypass flowpath 208. The propulsion of the bypass air may account for a majority of thrust generated by the turbine engine 172.

The engine assembly 10 may be included in various turbine engines other than the one described above. The engine assembly 10, for example, may be included in a geared turbine engine where a geartrain connects one or more shafts to one or more rotors in a fan section, a compressor section and/or any other engine section. Alternatively, the engine assembly 10 may be included in a turbine engine configured without a geartrain; e.g., a direct drive turbine engine. The engine assembly 10 may be included in a turbine engine with a single spool, with two spools (e.g., see FIG. 5), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a rotating assembly configured to rotate about an axis, the rotating assembly including an engine shaft and a phonic wheel threaded onto the engine shaft, the phonic wheel comprising a lubricant scoop; and
a sensor configured to measure fluctuations in a magnetic field induced by the phonic wheel during rotation of the rotating assembly about the axis;
wherein the lubricant scoop comprises a gutter projecting radially in an outward direction into the phonic wheel, the gutter projects axially into the phonic wheel, and the gutter extends circumferentially about the axis within the phonic wheel; and wherein the engine shaft comprises a plurality of passages arranged circumferentially about the axis, and each of the plurality of passages extends axially into the engine shaft from the gutter.

2. The assembly of claim 1, further comprising:
a sensor system comprising the phonic wheel and the sensor;
the sensor system configured to determine a rotational velocity of the rotating assembly.

3. The assembly of claim 1, wherein
the phonic wheel further comprises a castellated periphery; and
the castellated periphery is configured to induce the fluctuations in the magnetic field during the rotation of the rotating assembly about the axis.

4. The assembly of claim 3, wherein a tip of the sensor is disposed radially outboard of and adjacent the castellated periphery.

5. The assembly of claim 3, wherein
the castellated periphery comprises a plurality of indentations arranged circumferentially about the axis; and
each of the plurality of indentations projects radially and axially into the phonic wheel.

6. The assembly of claim 5, wherein
each of the plurality of indentations has a lateral width; and
each circumferentially neighboring pair of the plurality of indentations are spaced apart by a lateral distance that is equal to or less than the lateral width.

7. The assembly of claim 3, wherein
the castellated periphery comprises a plurality of teeth arranged circumferentially about the axis; and
each of the plurality of teeth projects radially out to a respective distal end.

8. The assembly of claim 1, wherein the lubricant scoop comprises an axial lubricant scoop.

9. The assembly of claim 1, wherein
the engine shaft further comprises a shoulder;
each of the plurality of passages extends axially through the shoulder; and
the phonic wheel is threaded onto the shoulder.

10. The assembly of claim 1, wherein the phonic wheel axially engages the engine shaft at a location discrete from a threaded interface between the phonic wheel and the engine shaft.

11. The assembly of claim 1, wherein
the engine shaft further comprises a shoulder;
the rotating assembly further comprises an engine component mounted on the engine shaft and abutted axially against the shoulder; and
the phonic wheel circumscribes and is threaded onto the shoulder.

12. The assembly of claim 11, wherein
the rotating assembly further comprises a stack nut threaded onto the engine shaft; and
the engine component is axially stacked and retained between the stack nut and the shoulder.

13. The assembly of claim 1, wherein the rotating assembly further comprises a bladed rotor connected to the engine shaft.

14. An assembly for a turbine engine, comprising:
a rotating assembly configured to rotate about an axis, the rotating assembly including an engine shaft and a phonic wheel threaded onto the engine shaft, the phonic wheel comprising a lubricant scoop; and
a sensor configured to measure fluctuations in a magnetic field induced by the phonic wheel during rotation of the rotating assembly about the axis;
wherein the engine shaft further comprises a shoulder;
wherein the rotating assembly further comprises an engine component mounted on the engine shaft and abutted axially against the shoulder;
wherein the phonic wheel circumscribes and is threaded onto the shoulder; and
wherein the engine component comprises an inner race of a rolling element bearing.

15. An assembly for a turbine engine, comprising:
a rotating assembly configured to rotate about an axis, the rotating assembly including an engine shaft and a phonic wheel threaded onto the engine shaft, the phonic wheel comprising a lubricant scoop; and
a sensor configured to measure fluctuations in a magnetic field induced by the phonic wheel during rotation of the rotating assembly about the axis;
wherein the rotating assembly further comprises an engine component mounted on the engine shaft; and
wherein the phonic wheel further comprises an anti-rotation tab projecting axially partially into a recess in the engine component.

16. An assembly for a turbine engine, comprising:
a rotating assembly configured to rotate about an axis, the rotating assembly including an engine shaft and a phonic wheel threaded onto the engine shaft at a threaded interface, the phonic wheel abutted axially against the engine shaft at a location discrete from the threaded interface, and rotating assembly further comprising an engine component mounted on the engine shaft; and
a sensor configured to measure fluctuations in a magnetic field induced by the phonic wheel during rotation of the rotating assembly about the axis, the phonic wheel rotationally fixed to the engine component by an anti-rotation feature.

17. The assembly of claim 16, wherein the phonic wheel comprises an axial lubricant scoop.

* * * * *